United States Patent [19]
Post

[11] 3,859,868
[45] Jan. 14, 1975

[54] INERTIAL ENERGY STORAGE APPARATUS

[75] Inventor: Stephen F. Post, Walnut Creek, Calif.

[73] Assignee: Post Group, Walnut Creek, Calif.

[22] Filed: July 19, 1973

[21] Appl. No.: 380,563

Related U.S. Application Data

[60] Continuation-in-part of Ser. No. 372,346, June 21, 1973, abandoned, Division of Ser. No. 68,959, Sept. 2, 1970, Pat. No. 3,741,034.

[52] U.S. Cl. ............................................... 74/572
[51] Int. Cl. .......................................... F16f 15/30
[58] Field of Search ........................... 74/572, 5.34

[56] References Cited
UNITED STATES PATENTS

| | | | |
|---|---|---|---|
| 3,296,886 | 1/1967 | Reinhart, Jr. .......................... | 74/572 |
| 3,363,479 | 1/1968 | Pickels .................................. | 74/572 |
| 3,602,066 | 8/1971 | Wetherbee, Jr. ...................... | 74/572 |
| 3,602,067 | 8/1971 | Wetherbee, Jr. ...................... | 74/572 |

Primary Examiner—Samuel Scott
Assistant Examiner—F. D. Shoemaker
Attorney, Agent, or Firm—Rankin A. Milliken

[57] ABSTRACT

Inertial energy storage rotors are disclosed which contain centrifugal loading elements of such mass and so distributed that the elasticity density ratios of radial increments of the rotors increase with mean radius. Some of the disclosed rotors include rings of high tensile strength material, such as glasses or embedded fiber composites. In some of these rotors the centrifugal loading elements are located only in the rings, while in others the centrifugal loading elements are located only between the rings, or both in the rings and between the rings. In some of these rotors there is only one high-strength ring.

35 Claims, 6 Drawing Figures

INERTIAL ENERGY STORAGE APPARATUS

This is a continuation-in-part of copending application Ser. No. 372,346, abandoned after July 19, 1973; filed June 21, 1973, which is a division of application Ser. No. 68,959, filed Sept. 2, 1970, now U.S. Pat. No. 3,741,034.

The present invention relates to inertial energy storage apparatus of the kind in which inertial energy is stored in a rotor and extracted therefrom by means, e.g., of a dynamoelectric machine coupled thereto, and more particularly to improved rotors for use in such apparatus.

It has been proposed to utilize such inertial energy storage apparatus in automotive, portable, and stationary applications.

Vehicles propelled by energy derived from inertial energy storage apparatus of this general kind have hitherto been made and used. A vehicle of this type which was actually put into regular service in a major city was a bus driven by power derived from a 3,300-pound, 64-inch diameter flywheel. The range of this vehicle on a single charge of rotational energy to the flywheel was limited to somewhat over one-half mile, however, and in consequence it was necessary to provide charging facilities at each bus stop; full charging at which required about 2 minutes.

More recently, proposals have been made for the utilization of diametrically-directed straight strands of high tensile strength materials in inertial energy storage rotors, in order to increase the stored energy density, i.e., the amount of energy stored per unit volume (or mass) of the energy storage apparatus.

These proposed constructions have achieved considerable increase in stored energy density as compared with the abovesaid bus propulsion system, but have not reached the stored energy density values which would appear to be required in order to make inertial energy propelled vehicles attractive as substitutes for the present, pollution-producing internal combustion engine powered vehicles in general use.

Proposed portable applications of inertial energy storage apparatus have included the use of such apparatus to power hand-held portable power tools, power mowers, and the like.

It has also been proposed to construct stationary inertial energy storage units of large enough capacity to replace the hydroelectric reservoirs now used as energy storage units in electrical energy distribution systems.

It is to be understood that inertial energy storage rotors embodying the present invention may be used with benefit in all of the abovesaid applications of inertial energy storage apparatus, as may inertial energy storage rotors embodying the invention claimed in the abovesaid pending parent application Ser. No. 68,959.

The prior art patents cited during the prosecution of the abovesaid pending parent application, Ser. No. 68,959, are U.S. Pat. Nos. 1,501,886; 2,577,313; 2,734,280; 3,296,886; 3,490,784; 3,602,066; and 3,602,067; and Austrian Pat. No. 61,717 of 1911.

Prior art U.S. Pat. No. 3,363,479 teaches the strengthening of a rotor by means of increased concentration of heavier particles near the periphery.

The need for the maximum possible stored energy density in inertial energy storage apparatus is especially critical in passenger vehicles, such as taxis and private passenger automobiles, in which maximum range per energy charge must be achieved without unduly sacrificing available passenger and cargo volume. Maximum stored energy density (both per unit mass and per unit volume) is also critical in inertia-powered hand tools, inertia-powered lawn mowers, and the like.

It is therefore an object of the present invention to provide inertial energy storage apparatus in which the stored energy density is greater than has hitherto been achieved.

Another object of the present invention is to provide inertial energy storage rotor constructions which reduce or eliminate the need for the variation of the mechanical properties of the high-strength rotor rings taught in the above-cited copending parent application, Ser. No. 68,959.

Other objects of the invention will in part be obvious and will in part appear hereinafter.

With these objects in view, the present invention comprises as a principal feature the provision of novel inertial energy storage rotors containing centrifugal loading elements which are of such mass and are so distributed that the elasticity-density ratios of toroidal portions of the rotors coaxial with their axes of rotation increase with mean radius.

Another feature of the present invention is the provision of novel inertial energy storage rotors each comprising a matrix and a plurality of high-strength elements encircling the rotor axis and incorporated in the matrix, the density of these matrices so varying that the elasticity-density ratios of toroidal portions of the rotors coaxial with their axes of rotation increase with mean radius.

The invention, accordingly, comprises the features of construction, combinations of elements, and arrangements of parts which will be exemplified in the constructions hereinafter set forth, and the scope of the invention will be indicated in the appended claims.

For a fuller understanding of the nature and objects of the invention, reference should be had to the following detailed description, taken in connection with the accompanying drawings, in which.

Figure 1:
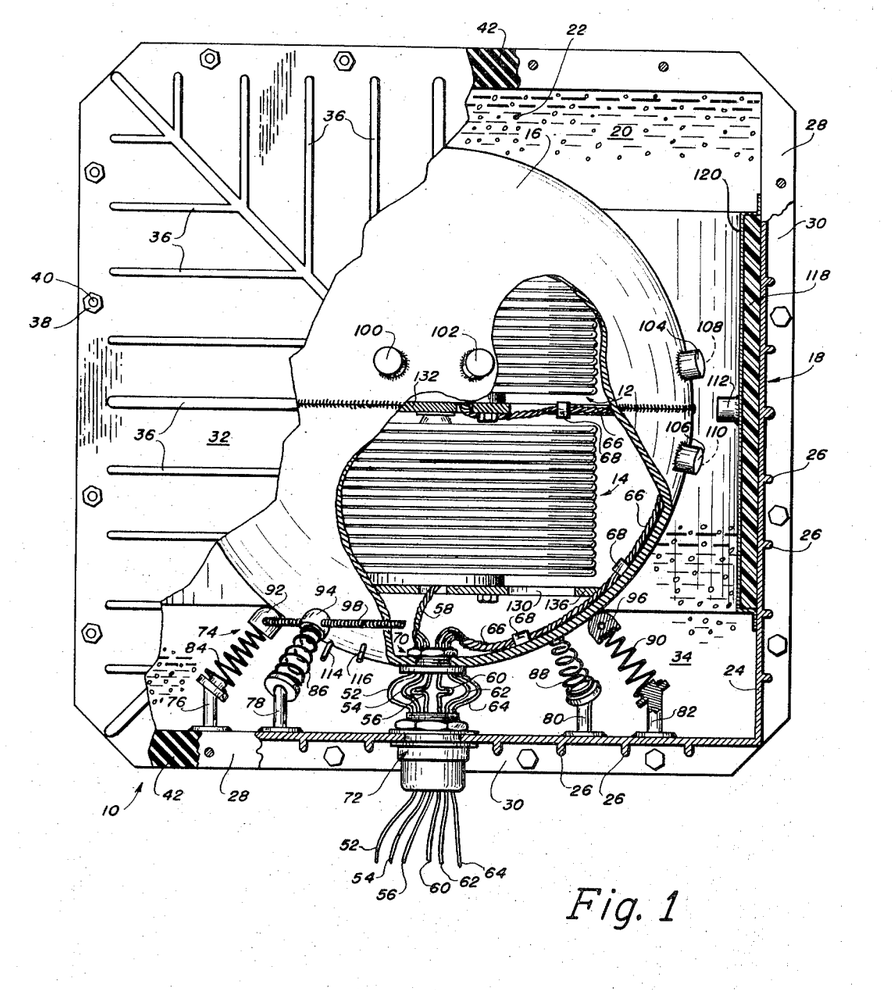
FIG. 1 is a vertical sectional view of an inertial energy storage module in which inertial energy storage rotors embodying the present invention are employed.
Figure 2:
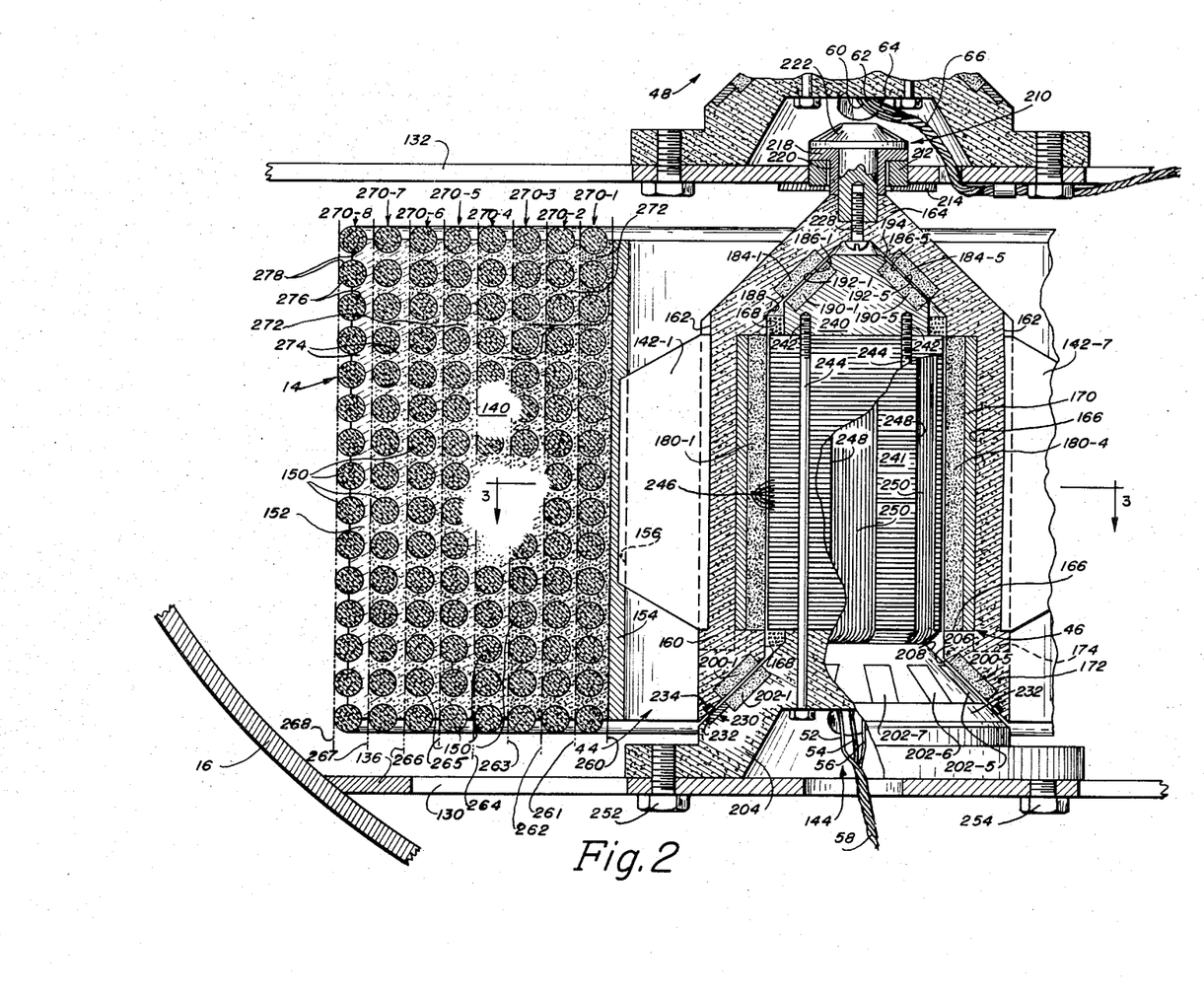
FIG. 2 is a fragmentary vertical sectional view of the inertial energy storage module of FIG. 1.
Figure 3:
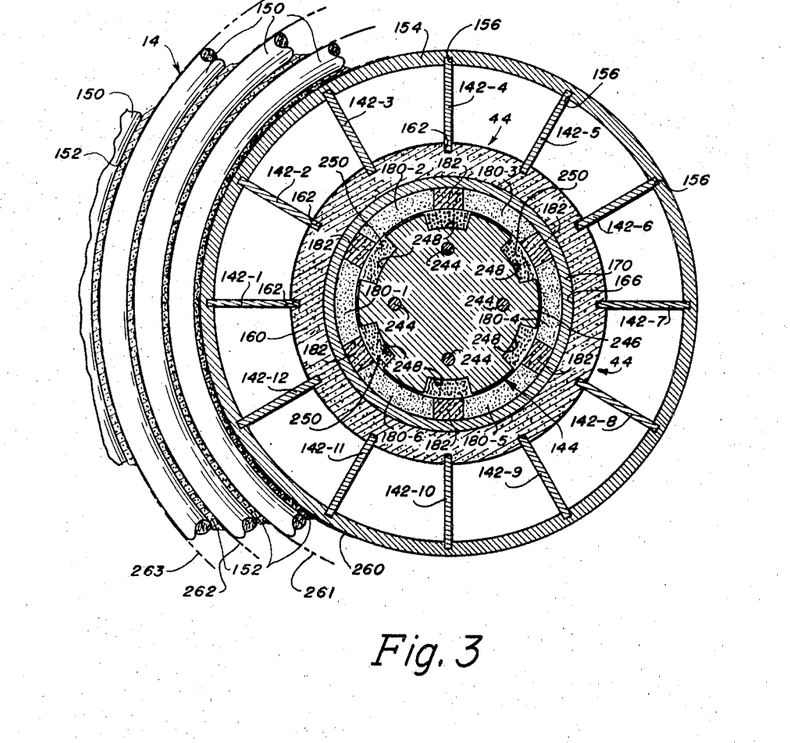
FIG. 3 is a fragmentary sectional view of the structure shown in FIG. 2, the plane of the section being indicated by the line 3—3 in FIG. 2.

Referring now to the drawings, there is shown in FIGS. 1, 2, and 3, taken together, an inertial energy storage unit or module employing a pair of rotors embodying the present invention.

The particular inertial energy storage module 10 which is shown in FIGS. 1, 2, and 3 comprises two inertial storage rotors 12, 14, of the present invention, mounted in an evacuated shell 16. As shown in FIG. 1, evacuated shell 16 is disposed in a liquid-filled tank 18. It is to be understood, however, that the use of a single rotor of the type claimed in the appended claims falls within the scope of the present invention.

In order to minimize windage losses, reduce ring deterioration due to chemical attack, and facilitate energy absorption in the event or rotor failure, spherical shell 16 may be evacuated to about $10^{-3}$ to $10^{-5}$ Torr.

In order to provide protection in the event that the rotors 12, 14 are inadvertently operated at rotary speeds greater than their maximum design speed, and one or both of them rupture, tank 18 is filled with a viscous, high-density liquid 20, such as ethylene glycol. A suitable expansion chamber, of the type used, e.g., in liquid-filled marine compasses, may be provided in a wall of tank 18 to compensate for the thermal expansion of liquid 20.

As an additional safety feature, liquid 20 may be filled, to the extent that it becomes a slurry, with small particles 22 of porous, highly crushable material, whereby the energy of centrifugally-propelled particles of a ruptured rotor may be absorbed.

A suitable material from which crushable particles 22 may be fabricated is that material known as polyurethane foam, which may be provided with a suitable protective coating.

Other safety features incorporated in the particular inertial energy storage module of FIGS. 1, 2, and 3 will be described hereinafter.

Tank 18 comprises a single casting or weldment 24 consisting of four walls which extend perpendicular to the plane of FIG. 1 and are joined along their edges which extend perpendicular to the plane of FIG. 1. The walls of casting or weldment 24 may be provided with stiffening ribs 26. Further, casting or weldment 24 is provided at its opposite, open ends with suitable flanges 28, 30 by means of which cover plates 32, 34 may be liquid-tightly affixed to casting or weldment 24. The end plates 32, 34 may be provided with stiffening ribs 36. The cover plates 32, 34 may suitably be affixed to the flanges 28, 30 of casting or weldment 24 by nuts 38 and studs 40, in which event it will be desirable to provide suitable gaskets 42.

As seen in FIGS. 2 and 3, the hub 44 of rotor 14 incorporates a six-pole alternator-motor (i.e., dynamo-electric machine serving alternatively as an alternator or as an alternating current motor). This alternator-motor is generally designated by the reference numeral 46. The assembly which includes rotor 12 is substantially identical to the assembly which includes rotor 14. The hub 48 of rotor 12 incorporates a six-pole alternator-motor 50 (not shown) which is substantially identical to alternator-motor 46 in the hub 44 of rotor 14. The electrical power generated by alternator-motor 46 is produced on three leads 52, 54, 56 which, when suitably cabled, are collectively designated by the reference numeral 58. The electrical power generated by alternator-motor 50 is produced on three leads 60, 62, 64 which, when suitably cabled, are collectively designated by the reference numeral 66. Cable 66 is affixed to the support means which support the adjacent ends of the hubs 44, 48, and to the wall of shell 16, by means of suitable clips 68. Leads 52, 54, 56, 60, 62, and 64 pass through the wall of shell 16 via vacuum-tight hermetic sealing means 70. Leads 52, 54, 56, 60, 62, 64 pass through the wall of tank 18 via liquid-tight sealing means 72. As shown in FIG. 1, free bights or hairpin-loops of leads 52, 54, 56, 60, 62, and 64 are provided between sealing means 70 and sealing means 72. These free portions of leads 52, 54, 56, 60, 62, and 64 are provided in order to accommodate motion of shell 16 with respect to tank 18, as will now be explained.

Shell 16 and its contents are so designed and the density of liquid 20 is so chosen that shell 16, along with its contents, is dampingly constrained thereby, shell 16 and its contents having a slightly negative buoyancy factor with respect to liquid 20. That is to say, liquid 20 is so chosen that in vehicular applications of the inertial energy storage module shell 16 and its contents follow accelerations of tank 18 in a damped manner, while, at the same time, shell 16 would lightly rest on the bottom of tank 18 but for the resilient support offered by support cradle 74, which will now be described.

Cradle 74 comprises a plurality of pedestals, only some of which, 76, 78, 80, 82, are shown in the drawings (FIG. 1). These pedestals are affixed to the bottom of tank 18 in a circular array. One of the conically wound coil springs 84, 86, 88, 90, etc., is affixed to the upper end of each pedestal 76, 78, 80, 82, etc. A head, 92, 94, 96, etc., is affixed to the upper end of each of said springs 84, 86, 88, 90, etc. The upper end of each head 92, 94, 96, etc., is provided with a smooth, rounded surface which is adapted to contact and support shell 16 without damaging it. A single, elongated coil spring 98 passes through suitable bores in all of said heads 92, 94, 96, etc., and resiliently maintains them against outward, spreading movement in response to the small downward force exerted by shell 16 and its contents. Spring 98 is of sufficient length, and its ends are so joined, that it normally exhibits a circular configuration, and thus does not contact the wall of shell 16. Shell 16, then, normally rests in cradle 74, upon heads 92, 94, 96, etc., and its movement in response to accelerations of tank 18 (in vehicular applications of the inertial energy storage module) is damped by liquid 20.

Shell 16 is further resiliently maintained in its position within tank 18 by means of four sets of five permanent magnets, 100, 102, 104, 106, 108, 110, 112, etc. A single permanent magnet is affixed to the interior of each vertical wall of tank 18. Four permanent magnets, affixed to the outside of shell 16, cooperate with each one of the permanent magnets which is affixed to a wall of tank 18. Thus, as shown in FIG. 1, the four permanent magnets 104, 106, 108, 110 (108 and 110 being concealed behind 104 and 106, respectively in FIG. 1) together cooperate with permanent magnet 112, which is affixed to the right-hand, vertical wall of tank 18, as shown in FIG. 1. The outer ends of all of the permanent magnets 100, 102, 104, 106, 108, 110, 112, etc., i.e., the ends remote from the ends of these magnets which are affixed to a wall of tank 18, or to shell 16, are of the same magnetic polarity. For example, the outer ends of all of the permanent magnets 100, 102, 104, 106, 108, 110, 112, etc., may be South poles. Further, the magnets of each set of four affixed to the outer surface of shell 16, e.g., 104, 106, 108, 110, are normally equidistant from their associated magnet which is affixed to a wall of tank 18, e.g., magnet 112. Thus, any force tending to displace shell 16 from its normal position will be opposed by forces produced by the above-described sets of four permanent magnets, each set cooperating with its associated one permanent magnet affixed to a wall of tank 18. For example, any tendency of shell 16 to rotate about its vertical axis in a clockwise direction (looking down from the top of FIG. 1) will be opposed by repulsion forces between magnets 108 and 110 and magnet 112, as well as by similar repulsion forces produced by the magnets affixed to the three other vertical walls of tank 18 and two each of their associated sets of four permanent magnets. The magnetic positioning arrangement just described also produces forces opposing the upward displacement of shell 16 in tank 18, and opposing the tilting of the vertical axis of shell 16 with respect to the horizontal walls of tank 18. Alternatively, each of the sets of five coacting magnets may be replaced with a coil spring extending from the tank wall to the nearest point of the shell.

A plurality of pins 114, 116, etc., are affixed to the outer surface of shell 16 in a horizontal circular array, as indicated in FIG. 1. These pins, 114, 116, etc., serve to prevent extreme angular excursions of shell 16, in vehicular applications of the inertial energy storage module, when they engage spring 98 or heads 92, 94, 96, etc.

Additional protection in the event of rupture of rotor 12 or rotor 14 may be provided by affixing a ring-shaped band 118 of suitably selected material to the inside of tank 18, as shown in FIG. 1. Such a suitably selected material may be made, for instance, from continuous rovings of carbonized filamentary material bonded into a unitary mass with epoxy cement. When such a band 118 of carbon-epoxy material, or the like, is used, it is desirable to affix the outer positioning magnets 112, etc., to straps 120, the ends of which are affixed to the vertical walls of tank 18 immediately outside the wall area covered by band 118, as shown in FIG. 1. By this means it is possible to avoid breaks in the carbon filament rovings, while at the same time supporting band 118 is in its operative position. Provision of band 118 in ring-shaped form (i.e., of circular cross-section) permits damping liquid 20 to contact the metal walls of tank 18 over maximum area for maximum heat transfer. If band 118 were of square cross-section, and contacted the vertical walls of tank 18 throughout its outer surface, considerable heat transfer surface would thereby be lost.

Considering now the apparatus disposed within shell 16, it may be seen from FIG. 1 that the principal content of shell 16 is the two inertial energy storage rotors 12, 14.

Rotors 12, 14 are supported within shell 16 by three spiders 130, 132, 134, only two of which, viz., 132 and 134 are shown in the drawings.

Spider 134 is located above rotor 12 in the upper portion of shell 16, and suports the upper end of rotor 12. Spiders 130, 132, 134 may be directly affixed to the inner surface of shell 16, as by welding, and may include an outer ring, such as indicated by the reference numeral 136 in FIGS. 1 and 2, in order to provide stress distribution. The lower ring, 136, if such rings are employed, may be provided with a suitable opening at one place on its periphery to accommodate cable 66.

Referring now to FIGS. 2 and 3, the construction of lower rotor 14 will be described in detail, it being understood that upper rotor 12 is substantially identical in construction to lower rotor 14.

Rotor 14 comprises a rim or felly 140, a plurality of spokes 142-1 through 142-12, and a hub 44. Hub 44 is journalled upon a spindle assembly, or spindle, 144 (FIG. 2).

Felly 140 is comprised of a plurality of rings 150, fabricated from high tensile strength materials, e.g., epoxy-PRD-49-III composites, selected in accordance with the principles of the present invention, as will be more fully set forth hereinafter.

In accordance with a preferred embodiment of the present invention, the rings 150 of FIGS. 1 through 3 are disposed in a plurality of cylindrical shells. As may be seen in FIG. 2, each of the cylindrical shells consists of fifteen rings 150. The felly 140 of the embodiment of the present invention shown in FIGS. 1 through 3, then, comprises 120 high-strength rings, each of which is designated by the reference numeral 150, these 120 high-strength rings 150 being disposed in the collocation consisting of eight concentric cylindrical shells of rings as illustrated in FIG. 2.

It is to be understood, however, that the term "collocation" is used herein in its broadest acceptation, to include any spatial arrangement of physical elements in which each element has a predetermined location defined with respect to the positions of the other elements. Thus, the present invention is not limited to the particular collocation of 120 rings which is illustrated in FIG. 2, nor to the employment of rings arranged in concentric cylindrical shells, nor to the employment of shells having equal numbers of rings. An alternative ring collocation falling within the scope of the term "collocation" as used herein is shown in FIG. 9 of U.S. Pat. No. 3,683,216. In some embodiments the number of rings may exceed 1,000.

It is to be further understood that the present invention is not limited to the employment of rings taking the form known as "anchor rings," i.e., rings having circular cross-section, as shown in FIGS. 1 through 3, but also embraces constructions in which the rings are of any toroidal configuration. In some cases, for instance, each shell may be a single thin ring of considerable axial extent and of substantially rectangular cross-section. For another example, see rings 280 in FIG. 5.

The term "toroid" is used herein in its broadest acceptation, to include any surface generated by the rotation of a plane closed curve about an axis lying in its plane and not intersecting it; the expression "plane closed curve" including quadrilaterals. The adjective "torodial" as used herein embraces within its scope any surface defined in the previous sentence, and any body having such a surface. The term "rectangular toroid" as used herein, denotes any toroid having a rectangular generatrix.

The term "thin ring" as used herein denotes any ring whose radial thickness is sufficiently small in relation to its mean radius so that the action of centrifugal force produces substantially only pure hoop stresses, all other types of stress being negligible by comparison.

The rings of felly 140 are embedded in a matrix 152 fabricated, for example, from an epoxy-polymer compound which is loaded with lead powder or flakes as hereinafter described.

The terms "matrix" and "matrix means" as used herein are in no sense limited to the particular matrix shown and described hereinabove in connection with FIGS. 1 through 3, and designated by the reference numeral 152.

Rather, the terms "matrix" and "matrix means," and their equivalents "collocating means," "interstitial means," and "positioning means," are used herein in their broadest acceptation, to denote any means which may be employed to maintain the rings or other elongated high-strength elements of an inertial energy storage rotor of the present invention in their operative juxtaposition.

Thus, it will be understood that the terms "matrix," "matrix means," "collocating means," "interstitial means," and "positioning means," as used herein, in addition to matrix 152 shown and described herein, matrix constructions such as those shown and described in connection with FIGS. 5 through 11 of the abovesaid U.S. Pat. No. 3,683,216 of Richard F. Post.

The matrix 152 itself may be affixed to a cylindrical core 154, as by cementing. Core 154 may be provided with a plurality of slots 156 which are adapted to receive the outer ends of the spokes, 142-1 through 142-12.

As may be seen by comparison of FIGS. 2 and 3, spokes 142-1 through 142-12 may be made of sheet material, e.g., sheet aluminum, and may be of light construction.

As shown in FIG. 2, it is desirable to taper the thin, fin-like spokes 142-1 through 142-12 outwardly in order to reduce the radial stresses therein to a tolerable level. This taper may, for instance, very inversely with the square of the radius, whereby the radial stress is substantially reduced relative to the stress which would occur at the same radius in a non-tapered spoke. In other words, spokes 142-1 through 142-12 function only to support the felly 140 in its operative position relative to hub 44 and to transmit the relatively weak torques required during power output and power input to the felly 140, and thus they may be made of very thin material, if this is found desirable in a particular design. It should be noted that only relatively weak torques are transmitted by spokes 142-1 through 142-12 because of the high speed of rotation at which the rotors of the devices of the invention are designed to operate, e.g., speeds in the range of about 500 revolutions per second to 2,500 revolutions per second.

Further detailed description of certain particular parts of the inertial energy storage module of the present drawings may be found in the abovesaid U.S. Pat. No. 3,683,216, of Richard F. Post, issued on Aug. 8, 1972.

Hub 44 comprises a body 160 of high-strength material such as carbon fiber-epoxy composite (see, "Carbon Fiber Composites for Aerospace Structures," A. C. Ham, *Physics Bulletin* (British), Vol., 20, p. 444, 1969; *Popular Science* Magazine, Feb., 1969) which is of generally cylindrical configuration, and is provided on its outer surface with a plurality of slots 162, each one of said slots 162 being adapted to supportingly receive the inner end of one of the spokes 142-1 through 142-12. As seen in FIG. 2, hub body 160 is provided at its upper end with an integral, generally conical, cap member 164, the function of which will be hereinafter explained in detail.

A cylindrical cavity 166 is provided in the inner face 168 of hub body 160. At the bottom of cavity 166, i.e., the part of cavity 166 most remote from the axis of hub 44, there is disposed a cylindrical magnetic shunt 170, which may be fabricated from magnetically soft iron, or may be fabricated from magnetic steel laminae in order to reduce iron losses. In order to emplace shunt 170 in cavity 166 the lower or skirt portion 172 of hub body 160 may be formed separately from the main cylindrical portion of hub body 160. When such a mode of construction is adopted, magnetic shunt 170 may be inserted into cavity 166 in a direction parallel to the axis of hub body 160, whereafter skirt member 172 may be joined to the main portion of hub body 160 along the seam indicated by the dashed lines 174 in FIG. 2. Alternatively, hub body 160, including an integral skirt 172, may be cast or molded around magnetic shunt 170. In either event, i.e., whether hub body 160 is of one-piece or two-piece construction, the part of hub body 160 extending below cavity 166, as seen in FIG. 2, will sometimes hereinafter be called the "skirt."

Also contained in cavity 166 are the permanent magnet field poles 180-1 through 180-6 of alternator-motor 46. As shown in FIG. 3, intermediate bodies 182 may be disposed between poles 180-1 through 180-6, and these intermediate bodies may be composed of the same material from which hub body 160 is formed. Poles 180-1 through 180-6 may be bolted or socketed to magnetic shunt 170, in the conventional manner, and the intermediate bodies 182 may be made integral with the main portion of hub body 160 by extending through suitable openings in the magnetic shunt 170.

As may be seen in FIG. 2, permanent magnets 184-1 and 184-5 are embedded in the inner face of the conical cap portion 164 of hub body 160. The inner faces 186-1 and 186-5 of said permanent magnets 184-1 and 184-5 are flush with the inner surface 188 of conical cap portion 164, and are contoured to match the contour of said inner surface 188. Eight additional permanent magnets 184-2 through 184-4 and 184-6 through 184-10 are also embedded in the inner surface 188 of the conical cap portion 164 of hub body 160. The permanent magnets 184-1 through 184-10 are equiangularly spaced about the axis of hub body 160, forming a circle whose plane is perpendicular to the axis of hub body 160. The inner surfaces 186-1 through 186-10 of the permanent magnets 184-1 through 184-10 are all flush with the conical inner surface 188 of the cap portion 164 of hub body 160. The permanent magnets 184-1 through 184-10 cooperate with a corresponding plurality of permanent magnets 190-1 through 190-10 (FIG. 2) to act as a very low friction periodic magnetic bearing for the purpose of rotatably supporting rotor 14 for low friction rotation about its spindle 144, the outer surfaces 192-1 through 192-10 of these permanent magnets being flush with the outer surface 194 of the generally concial upper end of spindle 144.

A second periodic magnetic bearing, employed for the same purpose as the above described periodic magnetic bearing, is comprised of a plurality of permanent magnets 200-1 through 200-10, embedded in the skirt 172 of hub body 160, which cooperate with a corresponding plurality of permanent magnets 202-1 through 202-10 embedded in the base 204 of spindle 144. The exposed faces of the permanent magnets 200-1 through 200-10 are flush with the inner surface 206 of skirt 172, and are contoured to match the contour of the inner surface of skirt 172. Similarly, the exposed faces of the permanent magnets 202-1 through 202-10 are flush with the conical outer surface 208 of base 204, and are contoured to match the contour of the conical outer surface 208 of base 204.

Further detailed description of the class of periodic magnetic bearings which includes the abovesaid periodic magnetic bearings will be found in the abovesaid U.S. Patent of Richard F. Post.

In addition to the abovesaid periodic magnetic bearings, by which rotor 14 is supended during operation of the inertial energy storage module, upper and lower frictional snubber bearings are also provided to rotatably support rotor 14, though it is to be understood that said snubber bearings support rotor 14 only when rotor 14 is stationary, or rotating at very low speeds, prior to the attaining by rotor 14 of sufficient rotational speed to cause said periodic magnetic bearings to become fully effective or transiently when the module is sharply accelerated in vehicular applications.

The upper snubber bearing 210 is comprised of a suitable self-lubricating bushing, formed, e.g., of Teflon, which closely fits in an opening in the central portion of spider 132, and is maintained in position by a disk 214, which is itself affixed to the lower surface of spider 132. The outwardly projecting flange 218 of a generally cylindrical member 220 bears upon the upper surface of bushing 212, the cylindrical member 220 being itself affixed to the conical upper end 164 of hub body 160 by a retainer 222 and a cooperating screw 228.

The lower snubber bearing is comprised of a metal track member 232 which is embedded in the generally conical upper surface of base member 204, and is flush with the surface thereof. The other major member of lower snubber bearing 230 is the ring-like track member 234 which is embedded in the conical inner surface of skirt 172. Circular track 232, may, for instance, be composed of a heat resistant metal, while track member 234 may be composed, for instance, of a sinter metal impregnated with a lubricant such as molybdenum disulphide which will operate as a lubricant without substantially impairing the vacuum maintained in shell 16. Since rotor 14 is very rapidly brought into its high operating speed range (e.g., 500 to 2,500 revolutions per second) by means of the motor action of alternator-motor 46, it will be realized by those having ordinary skill in the art, from FIG. 2, that track 232 contacts track 234 only intermittently, during a very brief operating period, i.e., during the bringing of the rotor 14 into its range of operating speeds, and that, thus, despite the relatively large diameter of tracks 232 and 234 they can be fabricated in such a way as to have suitably extended life under the operating conditions imposed by the operation of the inertial energy storage module shown and described herein.

The construction of spindle 144 will now be desribed, in connection with FIGS. 2 and 3.

Spindle 164 comprises base 204, cap 240, and the stator portion 241 of alternator-motor 46. Base 204 and cap 240 may be formed from the same material from which hub body 160 is formed, in the same manner.

As pointed out hereinabove, the permanent magnets 190-1 through 190-10 of the upper periodic magnetic bearing are embedded in cap 240, with their exposed surfaces flush with the conical outer surface 194 of cap 240. Cap 240 is also provided with a plurality of tapped holes 242 which are adapted to receive and retain the threaded ends of elongated bolts 244 as may be seen in FIG. 2, said bolts 244 first passing through holes in base 204 and then through holes in magnetic steel laminations 246 before being engaged in said holes 242 in cap 240. In the event that the material of cap 240 is unable to sustain threads of sufficient strength, it will be realized by those having ordinary skill in the art that suitable bushings may, instead, be molded into cap 240, and those bushings provided with suitable tapped holes for coaction with the threaded ends of said bolts 244. Thus, it may be seen that spindle 242 is comprised of base 204, a stack of magnetic steel laminations 246, and cap 240, joined together by means of elongated bolts 244.

As may be seen in FIG. 3, the laminations 246 are so configured as to define, when joined in stacked relation, six vertical slots 248. A plurality of windings 250 are disposed in slots 248, said windings being so arranged, and so interconnected with leads 52, 54, and 56, as to produce three-phase alternating potential upon leads 52, 54, and 56 when excited by the periodic changes in linking magnetic flux occasioned by the rotation of rotor 14 about spindle 144. The design and arrangement of such alternator windings is well-known to those having ordinary skill in the dynamoelectric machine design art, and thus will not be described in detail herein. The corresponding stator windings of alternator-motor 50 are so arranged that rotor 12 will contrarotate with respect to rotor 14 when the same three-phase charging voltages are applied to leads 52, 54, 56 and 60, 62, 64.

As may be seen in FIG. 2, base 204 is affixed to the central portion of spider 130 by means of suitable bolts 252, 254, which are represented only generally in the drawings, the provision of suitable fasteners, and the like, being within the scope of one having ordinary skill in the art without the exercise of invention, for which reason such fasteners, and the like, will not be described in detail herein.

An inertial energy storage module of the present drawings including rotors embodying the present invention may be used, for instance, in a vehicle of the type described at page 150, et. seq., of *Machine Design* magazine, June 23, 1966, in the article entitled "The Cycloconverter Adjustable-Speed Drive," and at page 86, et. seq., of the *Popular Science* magazine, August, 1966, by substituting it for the engine driven alternator shown, for instance, in FIG. 11 of said *Machine Design* article.

As pointed out in said *Machine Design* article, there is no limitation on the maximum input frequency to the cycloconverter, but rather ". . . the form of the frequency converter output waveform will be improved as the frequency ratio across the converter is increased." Thus, the voltages produced on leads 52, 54, and 56, and on leads 60, 62, and 64 of the device of the present drawings may be simply adapted to supply operating power to the vehicle described in said *Machine Design* article by one having ordinary skill in the art without the exercise of invention.

The device of the present drawings including rotors embodying the present invention is, of course, also well adapted for other uses, such as the supplying of power to propel private passenger automobiles, taxis, rapid transit trains, and the like, as well as to portable and stationary applications.

Power to "charge" the device of the present drawings, i.e., bring rotors 12 and 14 up to maximum operating speed, may be provided by means of a variable frequency rotary power converter consisting of a high frequency alternator driven by a variable speed motor as generally taught in said *Machine Design* article. Alternatively, the device of the drawings may be "charged" by a solid-state light weight static frequency converter and dc link converter of the kind made and sold by Lear Siegler, Inc., suitably modified within the scope of those having ordinary skill in the art.

The alternator-motors in the hubs of rotors 12 and 14 may, of course, be alternatively wired for other operating frequencies, or for N-Phase operation, where N is other than 3, without the exercise of invention.

Returning now to FIGS. 2 and 3, and comparing those figures, it will be seen that felly 140 of rotor 14 is there divided by cylinders 260 through 268 into a plurality of coaxial toroidal portions 270-1 through 270-8, the common axis of said toroidal portions coinciding with the axis of rotor 14.

It is to be understood that cylinders 261 through 267 are not physical divisions or boundaries between separate parts of matrix 152. Rather, cylinders 261 through 267 are, in the embodiment of FIGS. 1 through 3, and in many other embodiments of the present invention, merely mathematical boundaries or intellectual constructs, which are convenient in defining certain major teachings of the present invention, and in designing embodiments of the present invention.

It may be, however, that in other embodiments of the present invention, it is convenient to separately fabricate toroidal portions 270-1 through 270-8, and in those embodiments cylinders 261 through 267 will coincide with interfaces between the toroidal portions.

The present invention embraces both embodiments in which the defining cylinders 261 through 267 coincide with interfaces between separate portions of the matrix and embodiments in which these defining cylinders do not coincide with such interfaces or physical divisions of the matrix.

Further, it is to be understood that the present invention is not limited to embodiments in which the defining cylinders are tangent to the outer extremities of the high-strength rings. For example, it will be convenient when designing a rotor having the ring collocation illustrated in FIG. 9 of U.S. Pat. No. 3,683,216 to select defining cylinders which divide some of the rings 280 into inner portions and outer portions lying different toroidal zones or portions of the rotor, and embodiments in which the defining cylinders are so selected will be understood to fall within the scope of the present invention.

Also, the present invention is in no sense limited to embodiments having 8 toroidal felly portions divided by 9 defining cylinders. Indeed, critical designs may be based upon computations involving 100 or more defining cylinders, all within the scope of the present invention.

The term "means radius," as used herein in connection with toroidal felly portions of the kind described hereinabove, is used in its common acceptation to denote the radius of a cylinder located halfway between the two cylinders which are the inner and outer boundaries of the particular toroidal felly portion. In other words, the mean radius of a particular toroidal felly portion is the radius of a cylinder located halfway between the cylinders which constitute the inner and outer boundaries of that toroidal felly portion.

The term "elasticity-density ratio" as used herein in connection with the above-described toroidal felly portions denotes the quotient of the circumferential Young's Modulus of a particular toroidal felly portion divided by the mean density of that particular toroidal felly portion.

For the purpose of this definition the circumferential Young's Modulus of a particular toroidal felly portion may be taken as equal to that of a linear specimen of the same materials as those from which said particular toroidal felly portion is made, fabricated in substantially the same way as said particular toroidal felly portion, and of the same cross-sectional area and cross-sectional configuration as said particular toroidal felly portion.

In other words, the elasticity-density ratio of a particular toroidal felly portion is the number by which the mean density of that toroidal felly portion must be multiplied in order to produce the numerical value of the circumferential Young's Modulus of that same toroidal felly portion.

The term "centrifugal separation index" as used herein in connection with a particular pair of said toroidal felly portions denotes the mathematical power to which the quotient of the mean radius of the larger diameter felly portion divided by the mean radius of the smaller diameter toroidal felly portion must be raised in order to equal the quotient of the circumferential elasticity-density ratio of the larger diameter toroidal felly portion divided by the circumferential elasticity-density ratio of the smaller diameter toroidal felly portion.

The term "toroidal felly portion" as used herein denotes all of the material of a rotor felly located between a pair of defining cylinders coaxial with the rotor. Thus, the toroidal felly portion 270-7 shown in FIGS. 2 and 3 consists of the high-strength rings 150 located between defining cylinders 266 and 267, that part of matrix 152 located between defining cylinders 266 and 267, and the centrifugal loading elements 272 located between defining cylinders 266 and 267. The term "portion" has the same meaning when required by the context.

The terms "loading means" and "centrifugal loading means" as used herein denote any substance or body, or combination of substances or bodies, incorporated in any portion of an inertial energy storage rotor to adjust the density of said portion to a desired value.

As may further be seen in FIG. 2, matrix 152 of the embodiment of FIGS. 1 through 3 consists of eight toroidal regions 274 (only two numbered, for clarity), which are separated by defining cylinders 261 through 267.

As may yet further be seen in FIG. 2, a plurality of centrifugal loading elements 272 are distributed throughout matrix 152, the inner or smaller ones of said toroidal regions 274 containing more of said centrifugal loading elements 272 than the outer or larger diameter ones of said regions.

In the embodiment of the present invention shown in FIGS. 1 through 3 each toroidal region 274 has centrifugal loading elements 272 distributed substantially uniformly throughout it. Speaking in terms of any radial plane (containing the axis of rotor 14), then, it can be said that the centrifugal loading elements 272 are distributed "step-wise." It should be understood, however, that embodiments in which the radial distribution of the centrifugal loading elements is continuously varied, or "smooth," rather than "step-wise," i.e., in which the distribution of the centrifugal loading elements varies within toroidal regions 274, also fall within the scope of the present invention.

In accordance with a principal feature of the present invention, the centrifugal loading elements 272 are of such mass and so distributed that the elasticity-density ratios of the toroidal felly portions 270-1 through 270-8 increase with mean radius; i.e., the elasticity-density ratio of portion 270-8 is greater than the elasticity-density ratio of any of the portions 270-1 through 270-7; the elasticity-density ratio of portion 270-7 is greater than the elasticity-density ratio of any of the portions 270-1 through 270-6; the elasticity-density ratio of portion 270-6 is greater than the elasticity-density ratio of any of the portions 270-1 through 270-5; etc.

In accordance with a further feature of the present invention the centrifugal loading elements 272 may be of such mass and so distributed that the centrifugal separation index of each pair of toroidal felly portions (e.g., 270-1 paired with 270-2, 270-2 paired with 270-3, etc.) is greater than zero.

In accordance with a particular feature of the present invention, the centrifugal loading elements 272 of a paricular class of embodiments may be of such mass and so distributed that the centrifugal separation index of each pair of toroidal felly portions is approximately 2; whereby the toroidal felly portions 270-1 through 270-8 undergo substantially the same percentage distortion, due to centrifugal force, at the same rotor speed, within the elastic limits of the ring and matrix materials, and thus the stresses in the matrix will be substantially uniform throughout the felly.

In accordance with yet another particular feature of the present invention, the centrifugal loading elements 272 of another particular class of embodiments may be of such mass and so distributed that the centrifugal separation index of each pair of toroidal felly portions is approximately 3, whereby the toroidal felly portions substantially "follow" each other as the speed of rotation of rotor 14 is increased (within the elastic limits of the ring and matrix materials).

While the two immediately above described particular classes of embodiments constitute particular features of the present invention, it is to be understood that the present invention also embraces classes of embodiments in which the centrifugal separation index of particular pairs of toroidal felly portions vary within the same felly.

Suitable procedures for the design of particular embodiments of the present invention will occur to those having ordinary skill in the art without the exercise of invention, after reading the present specification and consulting the present drawings.

It will also be evident to those having ordinary skill in the art after reading the present drawings that in order to maximize the amount of rotational energy which can be stored in an inertial energy storage rotor embodying the present invention the volume of high-strength ring material in the felly must be made as great as possible, and the volume of the matrix material in the felly must be made as small as possible. It will further be evident to those having ordinary skill in the art that this desideratum can be attained by employing high-strength rings of substantially rectangular cross-section (as in the embodiments of FIGS. 4 through 6), by reducing the axial distance between such rings as much as possible, and by selecting the materials of the centrifugal loading elements in such a way as to minimize the interspaces between the high-strength rings (radial).

It will also be evident to those having ordinary skill in the art, informed by the present disclosure, that embodiments of the present invention may be designed by largely empirical methods, by computational methods, or by combinations of empirical and computational methods.

One such empirical design method, and a corresponding embodiment, similar in geometry to the rotor felly 140 of FIG. 2, will now be described. The rings 150 of this empirically designed embodiment will be composed of intertwisted DuPont PRD-49-III (poly-p-benzamide) strands 276 bonded together by means of an epoxy bonding material 278. The matrix 152 of the finished rotor felly will consist of an epoxy-polymer compound loaded with amounts of lead powder 272 varying from toroidal felly portion to toroidal felly portion, as indicated schematically in FIG. 2. The circumferential Young's Moduli of the rings 150 may be determined from a linear specimen made in the same way from the same materials (viz., PRD-49-III strands and epoxy bonding material), said specimen having the same percentage of PRD-49-III strands in cross-section as said rings.

As will be obvious to those having ordinary skill in the art, only eight rings 150 need be fabricated for design purposes, none of said eight rings being of the same diameter as any other. The smallest one of said eight rings (called 150-1 for convenience) will be of the same diameter as the upper ring in toroidal felly portion 270-1 (FIG. 2). The largest one of said eight rings (called 150-8 for convenience) will be of the same diameter as the upper ring in toroidal felly portion 270-8 (FIG. 2). Ring 150-2 will be of the same diameter as the upper ring in toroidal felly portion 270-2; ring 150-3 will be of the same diameter as the upper ring in toroidal felly portion 270-3; etc.

Let it further be assumed that, in accordance with an abovesaid particular feature of the present invention, it has been decided that the centrifugal separation index of all adjacent pairs of high-strength rings in the felly of this embodiment will be 2. As pointed out above, then, any pair of rings or toroidal felly portions, when suspended in a matrix or fixture which does not prevent their free expansion and rotated about their common axis, will undergo the same percentage distortion at the same speed of rotation or angular velocity.

This being so, it will be obvious to those having ordinary skill in the art that an effective empirical method of design may be carried out by first encasing ring 150-1 in a body of the epoxy-polymer compound to be used for the matrix 152 loaded with the maximum practical amount of lead powder, this body being of the same inner and outer diameter as felly portion 270-1, and extending axially above and below ring 150-1 by a distance equal to half the distance between axially adjacent rings 150 as shown in FIG. 2. (This body will hereinafter be called "test body 151-1".)

After encasing ring 150-1 in test body 151-1, ring 150-3, for example, may be encased in a corresponding test body 151-3, differing from test body 151-1 in that it contains a smaller percentage of lead powder. (It will be evident that since the radii and Young's Moduli of rings 150-1 and 150-3 are known, and the density of ring 150-1 and test body 151-1, taken together, can be easily determined, a good approximation to the required density of ring 150-3 and test body 151-3 can easily be computed from the mathematical equivalent of the above definition of centrifugal separation index, algebraically manipulated for convenience, and thus the percentage of lead powder to be incorporated in test body 151-3 can be easily approximately calculated.)

Ring 150-1 in test body 151-1 may then be suspended in a matrix or fixture which does not prevent its free expansion and rotated about its axis at an angular velocity M, its corresponding percentage expansion being directly measured by observation.

After determining the percentage expansion of ring 150-1 and test body 151-1 at angular velocity M, ring 150-3 in test body 151-3 may be mounted in the same way and rotated at angular velocity M. If, in these conditions, ring 150-3 and test body 151-3 exhibit the same percentage distortion as that measured for ring 150-1 and test body 151-1, then this pair of rings and test bodies has the centrifugal expansion index 2, as desired. Otherwise, ring 150-3 may be encased in successive test bodies 151-3', 151-3", etc., containing different percentages of lead powder, until the same percentage expansion as ring 150-1 and test body 151-1 is achieved, and thus the required percentage of lead powder for the matrix of toroidal felly portion 270-3 is determined.

In the same way the correct percentage of lead powder to be incorporated in each toroidal felly portion of the rotor of this embodiment may be determined. Further, the maximum absolute expansion which the matrix material must be able to withstand can be easily calculated from the known percentage expansion and the diameters of the two largest high-strength rings.

From the above it will be seen that suitable designs for rotor fellys of the present invention may be determined by those having ordinary skill in the art by largely empirical methods.

It will also, however, be evident to those having ordinary skill in the art, from the above definition of centrifugal separation index, restated in mathematical form, that closely approximate rotor felly designs (including the percentage of loading material in each felly portion) can be determined by simple computation based upon easily measured ring, matrix material, and loading material properties, i.e., the means radii of the rings, the circumferential Young's Moduli of the toroidal felly portions (to which the centrifugal Young's Moduli of the high-strength rings will usually closely approximate), and the mean densities of the toroidal felly portions.

Examples of such calculated designs will now be given.

Figure 4:
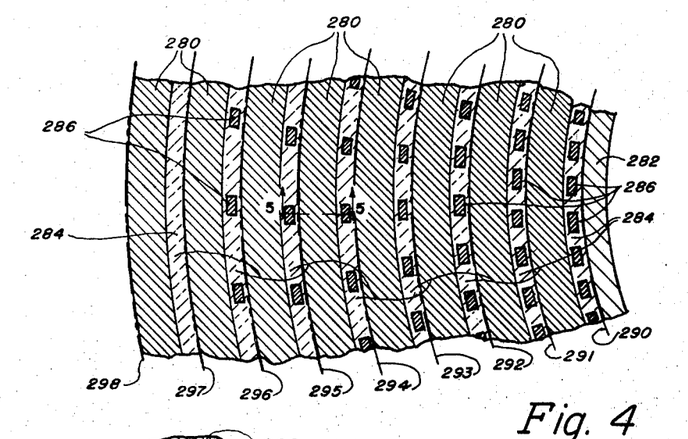
FIG. 4 is a fragmentary sectional view of a second type of rotor embodying the present invention, the plane of the section being perpendicular to the axis of rotation of the rotor.
Figure 5:
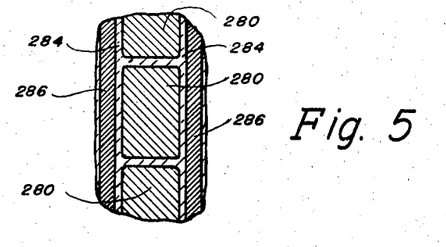
FIG. 5 is a fragmentary sectional view of said second type of rotor, the plane of the section including the axis of rotation of the rotor and being indicated by line 5—5 in FIG. 4.

The structure of the first of said calculated design examples is generally shown in FIGS. 4 and 5. As will be evident to those having ordinary skill in the art, this calculated design example, and the others following, may, if desired, be refined by empirical methods such as that described above.

Referring now to FIGS. 4 and 5 it will be seen that the high-strength rings 280 are of substantially rectangular cross-section. Since the results of these design calculations are not modified by the number of high-strength rings arrayed in the axial direction, the full axial extent of this embodiment is not indicated in FIG. 5. It is shown in FIG. 5, however, that the high-strength rings 280 in axial alignment are of substantially the same inner and outer diameters, and that the axial separation between the high-strength rings is made very small. As shown in FIG. 4, the felly of FIGS. 4 and 5 is mounted upon a core 282, similar to the core 154 of FIG. 2, discussed hereinabove. The high-strength rings 280 of the felly of FIG. 4 and 5 are maintained in predetermined collocation at rotor standstill by embedment in a matrix 284.

As may be seen by comparison of FIGS. 4 and 5, a plurality of loading members 286 are embedded in matrix 284.

As seen in FIG. 4, the felly of FIGS. 4 and 5 is considered to be divided into a plurality of toroidal portions lying between defining cylinders 290, 291, 292, 293, 294, 295, 296, 297, and 298.

It is to be understood that the defining cylinders 291 through 292, like the defining cylinders 261 through 267 of FIG. 2, are not physical divisions or boundaries between separate parts of matrix 284. Rather, defining cylinders 291 through 297 are merely mathematical boundaries or intellectual constructs which are convenient in defining certain teachings of the present invention, and in designing embodiments of the present invention. It may be true that in other embodiments of the present invention, however, it is convenient to separately fabricate the toroidal felly portions lying between adjacent ones of the defining cylinders 290 through 298, and in those embodiments defining cylinders 291 through 297 will coincide with interfaces between distinct toroidal portions of the rotor. The present invention embraces both embodiments in which the defining cylinders 291 through 297 coincide with interfaces between separately fabricated portions of the matrix and embodiments in which the defining cylinders 291 through 297 do not coincide with such interfaces.

For convenience, each toroidal felly portion of the felly of FIGS. 4 and 5 will be identified by the reference numerals of the two defining cylinders bounding it, separated by a hyphen. Thus, toroidal felly portion 290–291 lies between defining cylinders 290 and 291, toroidal felly portion 291–292 lies between defining cylinders 291 and 292, etc.

Referring again to FIGS. 4 and 5, it can be seen that each such toroidal felly portion consists of a plurality of axially aligned high-strength rings 280, a portion of the matrix 284, and a plurality of loading members 286, the rings 280 and loading members 287 being embedded in the matrix 284. It can also there be seen that the loading members 386 in each toroidal felly portion are disposed within the high-strength rings of that same felly portion, thus loading the high-strength rings centrifugally. Further, all of said loading members 286 are strips of high density material (tungsten in the present example) which are of rectangular cross-section, extending substantially from end to end of the felly, and lie substantially parallel to the axis of the rotor.

Let it be assumed that the high-strength rings 280 are composite rings consisting of PRD-49-III fibers filled with epoxy bonding compound, the PRD-49-III fibers constituting 60 percent by volume of each ring, the epoxy compound constituting 40 percent by volume of each ring, and the mean density of each of the rings being 1.35 grams per cubic centimeter. Let it be further assumed that the radial thickness (i.e., the dimension lying along the radii of the rotor) of each ring 280 is 2.0 centimeters; and that the radii of the defining cylinders are as follows: 290: 21.0 cm.; 291: 23.5 cm.; 292: 26.0 cm.; 293: 28.5 cm.; 294: 31.0 cm.; 295: 33.5 cm.; 296: 36.0 cm.; 297: 38.5 cm.; 298: 41.0 cm.

In addition, let it be assumed that the material of the centrifugal loading members 286 is tungsten.

The material of matrix 284 may, in this example, be an elastomer, which may be selected from a well-known reference source, such as *Reinforcement of Elastomers*, edited by Gerard Kraus, Interscience Publishers, Division of John Wiley & Sons, Inc., New York, copyright 1965.

As will be obvious to those having ordinary skill in the art when taught by the present disclosure, the elastomer selected from such a reference source should have one of the higher readily available values of tensile strength and also one of the higher readily available values of modulus of elasticity.

Taking the centrifugal separation indices of the pairs of toroidal felly portions of the felly of this example to be 2, it can be seen from the above definition of centrifugal separation index that the ratio of the elasticity-density ratio of any toroidal felly portion $j$ to the elasticity-density ratio of any smaller toroidal felly portion $i$ equals the ratio of the mean radius of the felly portion $j$, squared, to the mean radius of the felly portion $i$, squared. From this reformulation of the above definition of centrifugal separation index it can be simply calculated, by elementary methods, that a felly after FIGS. 4 and 5, made from the materials and with the dimensions set out immediately above, will have the following numbers of loading members 286 in each toroidal felly portion: 290-291: 174; 291-292: 139; 292-293: 108; 293-294: 83; 294-295: 59; 295-296: 37; 296-297: 18; 297-298: 0.

Figure 6:
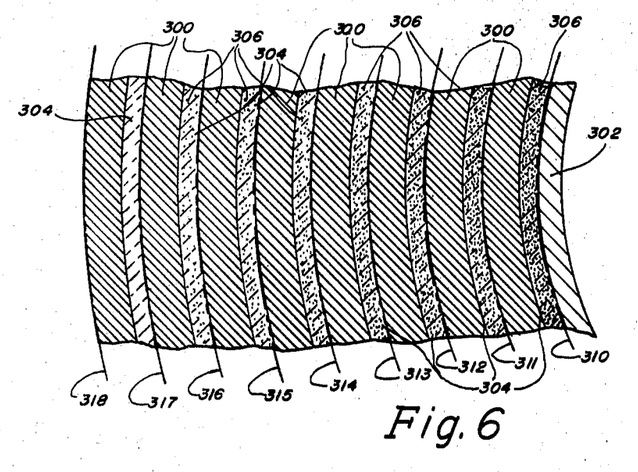
FIG. 6 is a fragmentary sectional view of a third type of rotor embodying the present invention, the plane of the section being perpendicular to the axis of rotation of the rotor.

The structure of an additional calculated design example is shown in FIG. 6, the high strength rings 300 of FIG. 6 are of the same, substantially rectangular cross-section as that of the high-strength rings 280 of FIGS. 4 and 5. Core 302 of the felly of FIG. 6 is similar to the core 154 of the embodiment of FIG. 2. The principal difference between the embodiment of FIG. 6 and the embodiment of FIGS. 4 and 5 is that the loading elements suspended in the matrix 304 of the embodiment of FIG. 6 are granules of tungsten powder, rather than tungsten strips. The defining cylinders 311 through 318 are of the same radii as the corresponding defining cylinders 291 through 298 of FIG. 4, i.e., defining cylinder 311 has 23.5 cm. as its radius, defining cylinder 312 has 26.0 cm. as its radius, etc. The radius of the defining cylinder 310, however, is 20.9 cm. This is due to the fact that the distance between the outer face of core 302 and the inner face of the inner ring 300 (of smallest diameter) is increased to 0.6 cm. in this example in order to achieve correct loading of the inner ring 300 while at the same time keeping the percentage by volume of tungsten powder in the portion of the matrix lying within felly portion 310-311 within reasonable limits. The spacing between all of the rings 300 at rotor standstill is 0.5 cm., as in the example of FIGS. 4 and 5. Let it be assumed that the high-strength rings 300 of FIG. 6 are composed of the same material as the high-strength rings 280 of FIGS. 4 and 5. Let it further be assumed that the material of matrix 304 is the same elastomer compound as that of the matrix 284 of FIGS. 4 and 5. Taking the centrifugal separation indices of the pairs of toroidal felly portions of the felly of this example to be 2, then, as pointed out above, the ratio of the elasticity-density ratio of any toroidal felly portion $j$ to the elasticity-density ratio of any smaller toroidal felly portion $i$ equals the ratio of the mean radius of the felly portion $j$, squared, to the mean radius of the felly portion $i$, squared. From this reformulation of the above definition of centrifugal separation index it can be simply calculated, by elementary methods, that a felly after FIG. 6, made from the materials and with the dimensions set out immediately above in connection with FIG. 6, will have the following percentages by volume of powdered tungsten in each toroidal felly portion, the toroidal felly portions being identified, as in connection with FIGS. 4 and 5, by the reference numerals of the two bounding defining cylinders, separated by a hyphen: 310-311: 69 percent 311-312: 60 percent; 312-313: 42 percent 313-314: 29 percent; 314-315: 19 percent; 315-316: 11 percent; 316-317: 5 percent; 317-318: 0 percent.

As a further calculated design example, consideration is now directed to a rotor felly generally like that shown in FIGS. 4 and 5 but having rings 280 of only six different diameters, rather than eight different diameters, these rings being fabricated from the same materials as the rings of the two previous calculated design examples, and being of 2.5 cm. radial thickness. For convenience, these rings will be designated R1 through R6, the R1 rings being the rings of smallest diameter, and the R6 rings being the rings of largest diameter. Further, each of these rings will be taken to lie in a toroidal felly portion designated P1 (containing all of the rings R1), P2 (containing all of the rings R2), etc. As shown in FIG. 4, the outer diameter of each ring is also the outer diameter of the corresponding toroidal felly portion. Further, each toroidal felly portion contains, in addition to its high-strength rings, a certain number (zero in the outer felly portion) of elongated loading elements 286, extending substantially throughout the axial length of the felly. Let it be assumed that the radii of the defining cylinders defining these toroidal felly portions are selected as 23.25 cm., 26.25 cm., 29.25 cm., 32.25 cm., 35.25 cm., 38.25 cm., and 41.25 cm., respectively, and thus the part of each toroidal felly portion containing the loading elements 286 is of 0.5 cm. radial extent. The loading elements extend substantially the full axial length of the felly, as in the above example of FIGS. 4 and 5. The matrix material 284 of this example is taken to be rubber, which as will be evident to those having ordinary skill in the art, should be of the upper available ranges of modulus of elasticity, and also relatively high in tensile strength.

Employing the above-stated reformulation of the definition of centrifugal separation index, it can be simply calculated by elementary methods that the number of 0.4 cm. by 0.8 cm. cross-section tungsten strips in each toroidal felly portion should be as follows: P1: 171; P2: 127; P3: 90; P4: 57; P5: 28; P6: 0, where the desired centrifugal separation index of the pairs of toroidal felly portions is 2; the loading members 286 being substantially uniformly angularly distributed about the rotor axis, except as displaced for rotor balance.

As yet another calculated design example let it be assumed that it is desired to design a rotor felly according to the present invention having the general structure shown in FIG. 6, but having high-strength rings 300 of only six different diameters. Let it further be assumed that these rings 300 are fabricated from the same materials and in the same way as the high-strength rings of the above calculated design examples, that these rings are designated R1 through R6, as in the previous example, and that these rings lie in toroidal felly portions P1 through P6, as in the previous example, and are all of 2.5 cm. radial thickness. The radii of the defining cylinders defining these toroidal felly portions are the same as the radii of the defining cylinders of the immediately previous example, except that the radius of the innermost defining cylinder is 23.15 cm. The material of matrix 304 is rubber, selected by those having ordinary skill in the art for high Young's Modulus and tensile strength, as in the previous examples, and is loaded with tungsten powder to cause the centrifugal separation indices of the pairs of toroidal felly portions P1 through P6 to closely approximate to 2. (It is to be understood, however, that not all embodiments of the present invention necessarily have the same centrifugal separation index for all pairs of high-strength rings.) Again utilizing the above reformulation of the definition of centrifugal separation index, the percentage by volume of tungsten powder in each felly portion can be calculated by elementary methods to be: P1: 60 percent; P2: 49 percent; P3: 31 percent; P4: 18 percent; P5: 8 percent; P6: 0 percent.

Given the above teachings, and the above examples, the selection of other graduated series of loading members with which to load successive toroidal felly portions of inertial energy storage rotors in order to carry out the present invention will be within the scope of those having ordinary skill in the art without themselves exercising invention.

While the Young's Modulus of the high-strength rings was held constant in the above examples, it is to be understood that the present invention also embraces embodiments in which the Young's Moduli of the high-strength rings varies with radius.

It is also to be understood that rotors comprising embedded fiber composite material rings in which the embedded fibers are intertwisted fall within the scope of the present invention.

According to another aspect of the present invention the rings of the outer toroidal felly portions of the disclosed rotors are so made as to insure that in the event that the rotor is inadvertently operated at a speed greater than the maximum operating speed for which it is designed only the rings of the outer felly portion will fail, thus minimizing the amount of material thrown outward in the event of inadvertent overspeeding of the rotor. It also lies within the scope of the present invention to thus modify one or more, rather than all, of the rings of the outer felly portion of a rotor of the present invention. All variations in the structure of certain ones of the disclosed high-strength rings by means of which they can be made more susceptible to rupture than the balance of the rings are embraced within the scope of the present invention. By way of example, one or more rings of the outer felly portion may be notched in order to locally reduce its cross-sectional area, or may be made in part of a material of lower breaking strength. Further, it should be noted that the rupture of only one such designedly "weak" ring will probably bring about the piercing of shell 16, but not the piercing of tank 18, thus causing the interior of shell 16, due to its evacuated state, to rapidly fill with liquid 20, by which the remaining energy stored in the rotors 12 and 14 will be rapidly dissipated in a nondestructive manner.

It will thus be seen that the objects set forth above, among those made apparent from the preceding description, are efficiently attained, and, since certain changes may be made in the above constructions without departing from the scope of the invention, it is intended that all matter contained in the above description, or shown in the accompanying drawings, shall be interpreted as illustrative only, and not in a limiting sense.

Thus, the present invention embraces within its scope embodiments in which part of the centrifugal loading elements are contained within the bodies of one or more of the high-strength rings. The present invention also embraces embodiments in which the high-strength rings are solid rings of quartz or other glass or glasses. The present invention also embraces embodiments in which the high-strength rings take the form of axially continuous cylindrical shells, and the collocating means are separate members disposed between these rings, which do not completely surround any of the rings. In some embodiments of the present invention the centrifugal loading elements are localized regions of the collocating means or of the collocating means and some of the high-strength rings which are treated to have differing density from the remainder of the collocating means or high-strength rings. Further, it is to be understood that the present invention is not limited to inertial energy storage rotors which are mechanically connected to dynamoelectric machines but embraces as well inertial energy storage rotors to which energy is imparted by purely mechanical means and from which energy is derived by purely mechanical means.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An inertial energy storage rotor comprising centrifugal loading means incorporated in each one of a plurality of portions of the rotor, each of said portions being bounded by a pair of cylinders which are coaxial with the rotor, and the elasticity-density ratios of said portions increasing with mean radius.

2. An inertial energy storage rotor as claimed in claim 1 in which at least some of said loading means are elongated bodies disposed parallel to the axis of the rotor and extending substantially from end to end of the rotor.

3. An inertial energy storage rotor as claimed in claim 1 in which at least some of said loading means are particles.

4. An inertial energy storage rotor, comprising:
   a plurality of circumferentially extending, high-strength elements of different mean radii, each of said elements being located in a particular cylindrical zone of the rotor; and
   positioning means for positioning said elements in a predetermined, substantially coaxial collocation at rotor standstill;
   the elasticity-density ratio of all of the rotor material in each of said zones being greater than the elasticity-density ratio of all of the rotor material in any zone of smaller mean radius.

5. An inertial energy storage rotor as claimed in claim 4 in which at least some of said zones include loading means positioned by said positioning means.

6. An inertial energy storage rotor, comprising:
a plurality of groups of elongated high-strength elements encircling the rotor axis at different mean radii, each group of elements being located in a portion of the rotor bounded by a pair of cylinders which are coaxial with the rotor;
interstitial means uniting said elongated high-strength elements; and
loading means incorporated in each of said portions of the rotor;
the elasticity-density ratio of each of said portions of the rotor being greater than the elasticity-density ratio of any of said portions which is of smaller mean radius.

7. An inertial energy storage rotor as claimed in claim 6 in which at least some of said loading means are elongated bodies disposed parallel to the axis of the rotor and extending substantially from end to end of the rotor.

8. An inertial energy storage rotor as claimed in claim 6 in which at least some of said loading means are particles.

9. An inertial energy storage rotor as claimed in claim 6 in which the elongated high-strength elements of each of said groups are bonded together into separate rings by bonding means.

10. An inertial energy storage rotor as claimed in claim 9 in which the elongated high-strength elements of at least some of said rings are intertwisted before being bonded together by said bonding means.

11. An inertial energy storage rotor as claimed in claim 9 in which at least some of said loading means are elongated bodies disposed parallel to the axis of the rotor and extending substantially from end to end of the rotor.

12. An inertial energy storage rotor as claimed in claim 9 in which at least some of said loading means are particles.

13. An inertial energy storage rotor as claimed in claim 12, in which all of said particles are located outside of the bodies of said rings.

14. An inertial energy storage rotor as claimed in claim 12, in which all of said particles are located within the bodies of said rings.

15. An inertial energy storage rotor, comprising:
a plurality of groups of elongated high-strength elements encircling the rotor axis at different mean radii, each group of elements being located in a portion of the rotor bounded by a pair of cylinders which are coaxial with the rotor;
interstitial means uniting said elongated high-strength elements; and
loading means incorporated in each of said portions of the rotor;
said loading means so adjusting the densities of said portions of the rotor that their centrifugal separation indices are greater than zero.

16. An inertial energy storage rotor as claimed in claim 15 in which at least some of said loading means are elongated bodies disposed parallel to the axis of the rotor and extending substantially from end to end of the rotor.

17. An inertial energy storage rotor as claimed in claim 15 in which at least some of said loading means are particles.

18. An inertial energy storage rotor as claimed in claim 15 in which the elongated high-strength elements of each of said groups are bonded together into separate rings by bonding means.

19. An inertial energy storage rotor as claimed in claim 18 in which the elongated high-strength elements of at least some of said rings are intertwisted before being bonded together by said bonding means.

20. An inertial energy storage rotor as claimed in claim 18 in which at least some of said loading means are elongated bodies disposed parallel to the axis of the rotor and extending substantially from end to end of the rotor.

21. An inertial energy storage rotor as claimed in claim 18 in which at least some of said loading means are particles.

22. An inertial energy storage rotor as claimed in claim 21, in which all of said particles are located outside of the bodies of said rings.

23. An inertial energy storage rotor as claimed in claim 21, in which all of said particles are located within the bodies of said rings.

24. An inertial energy storage rotor, comprising:
a plurality of high-strength rings of different mean radii, each ring being located in a portion of the rotor bounded by a pair of cylinders which are coaxial with the rotor;
collocating means for maintaining said high-strength rings in predetermined collocation at rotor standstill; and
loading means incorporated in each of said portions of the rotor;
the elasticity-density ratio of each of said portions of the rotor being greater than the elasticity-density ratio of any of said portions which is of smaller mean radius.

25. An inertial energy storage rotor as claimed in claim 24 in which at least some of said loading means are elongated bodies disposed parallel to the axis of the rotor and extending substantially from end to end of the rotor.

26. An inertial energy storage rotor as claimed in claim 24 in which at least some of said loading means are particles.

27. An inertial energy storage rotor as claimed in claim 26, in which all of said particles are located outside of the bodies of said high-strength rings.

28. An inertial energy storage rotor as claimed in claim 26, in which all of said particles are located within the bodies of said high-strength rings.

29. An inertial energy storage rotor, comprising:
a plurality of high-strength rings of different mean radii, each ring being located in a portion of the rotor bounded by a pair of cylinders which are coaxial with the rotor;
collocating means for maintaining said high-strength rings in predetermined collocation at rotor standstill; and
loading means incorporated in each of said portions of the rotor;
said loading means so adjusting the densities of said portions of the rotor that their centrifugal separation indices are greater than zero.

30. An inertial energy storage rotor, as claimed in claim 29 in which at least some of said loading means are elongated bodies disposed parallel to the axis of the rotor and extending substantially from end to end of the rotor.

31. An inertial energy storage rotor, as claimed in claim 29 in which at least some of said loading means are particles.

32. An inertial energy storage rotor, as claimed in claim 31, in which all of said particles are located outside of the bodies of said high-strength rings.

33. An inertial energy storage rotor, as claimed in claim 31, in which all of said particles are located within the bodies of said high-strength rings.

34. An inertial energy storage rotor comprising centrifugal loading means incorporated in each one of a plurality of portions of the rotor, each of said portions being bounded by a pair of cylinders which are coaxial with the rotor, and the elasticity-density ratios of said portions so varying with mean radius that their centrifugal separation indices are greater than zero.

35. An inertial energy storage rotor comprising centrifugal loading means incorporated in each one of a plurality of portions of the rotor, each of said portions being bounded by a pair of cylinders which are coaxial with the rotor, and the elasticity-density ratios of said portions so varying with means radius that their centrifugal separation indices are greater than one.

* * * * *